Dec. 29, 1953

W. H. SCHYMIK 2,664,456

HINGED BUS ENCLOSURE

Filed June 22, 1950

5 Sheets-Sheet 1

INVENTOR
WALTER H. SCHYMIK
BY
Oetrolenk & Faber
ATTORNEYS

Dec. 29, 1953

W. H. SCHYMIK 2,664,456

HINGED BUS ENCLOSURE

Filed June 22, 1950

5 Sheets-Sheet 2

INVENTOR
WALTER H. SCHYMIK
BY
Ostrolenk & Faber
ATTORNEYS

Dec. 29, 1953 W. H. SCHYMIK 2,664,456
HINGED BUS ENCLOSURE
Filed June 22, 1950
5 Sheets-Sheet 3
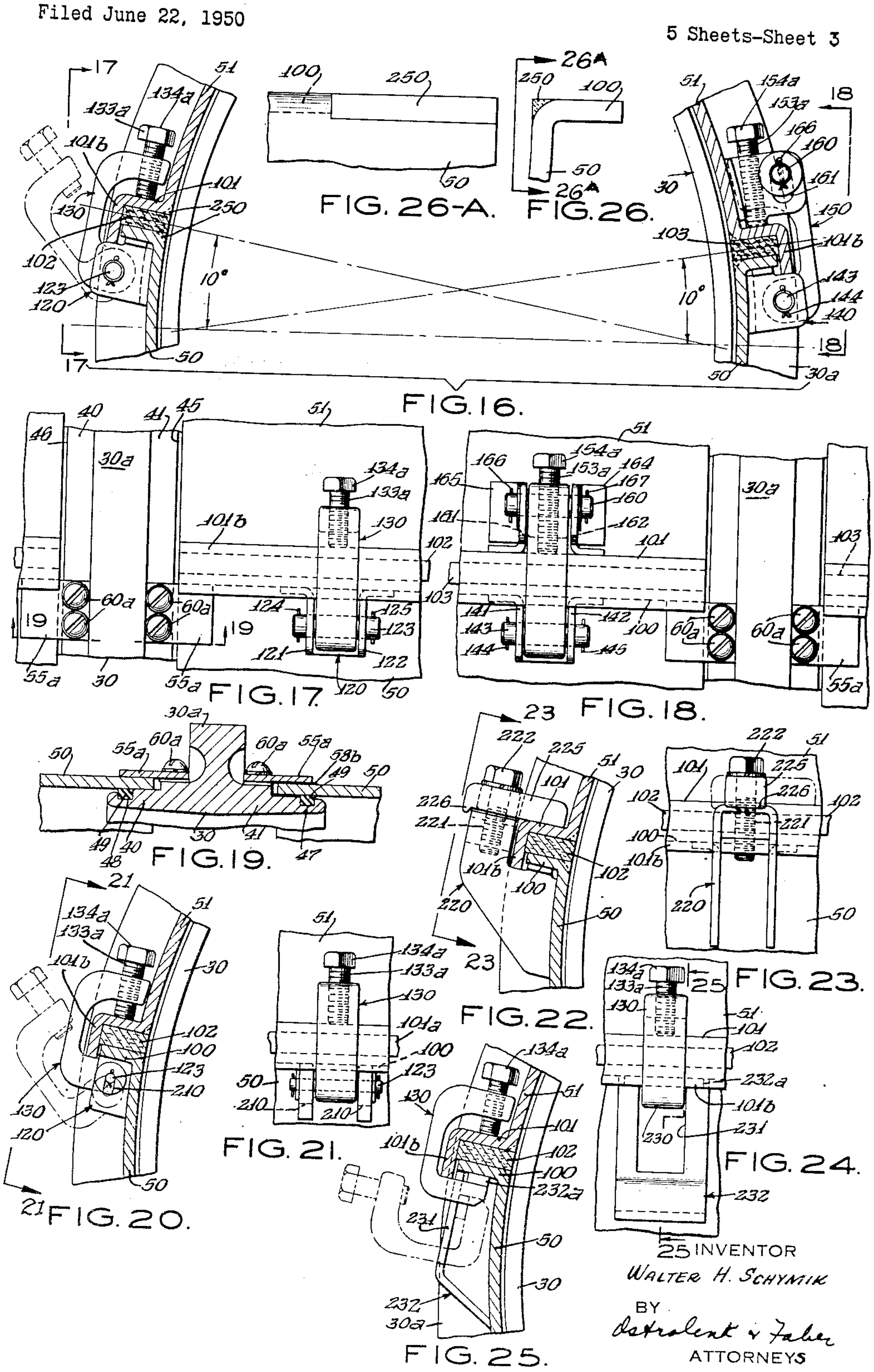
FIG. 16. FIG. 17. FIG. 18. FIG. 19. FIG. 20. FIG. 21. FIG. 22. FIG. 23. FIG. 24. FIG. 25. FIG. 26. FIG. 26-A.
INVENTOR
WALTER H. SCHYMIK
BY
Ostrolenk & Faber
ATTORNEYS Dec. 29, 1953

W. H. SCHYMIK

HINGED BUS ENCLOSURE 2,664,456

Filed June 22, 1950

5 Sheets-Sheet 4

INVENTOR
WALTER H. SCHYMIK

BY
Ostrolenk & Faber
ATTORNEYS

Dec. 29, 1953 W. H. SCHYMIK 2,664,456

HINGED BUS ENCLOSURE

Filed June 22, 1950 5 Sheets-Sheet 5

INVENTOR
WALTER H. SCHYMIK
BY
Ostrolenk & Faber
ATTORNEYS

Patented Dec. 29, 1953

2,664,456

UNITED STATES PATENT OFFICE 2,664,456

HINGED BUS ENCLOSURE

Walter H. Schymik, Oreland, Pa., assignor to I-T-E Circuit Breaker Company, Philadelphia, Pa., a corporation of Pennsylvania Application June 22, 1950, Serial No. 169,615

3 Claims. (Cl. 174—99)

My present invention relates to enclosures for electrical buses and more particularly to a hinged bus enclosure wherein each phase of a bus is fully enclosed while, at the same time, the enclosure is so arranged that it may readily be opened for inspection of the bus and to simplify any replacements or repairs which may be required.

Thus, the primary object of my invention is the provision of a bus enclosure for isolated phase bus runs wherein the enclosure itself may readily be opened and closed without dismantling the enclosure in any way.

The foregoing and many other objects of my invention will become apparent in the following description and drawings in which:

Figure 16 is a cross-sectional view through another form of isolated phase bus enclosure showing a modified form of hinge and clamping structure.

Figure 27:
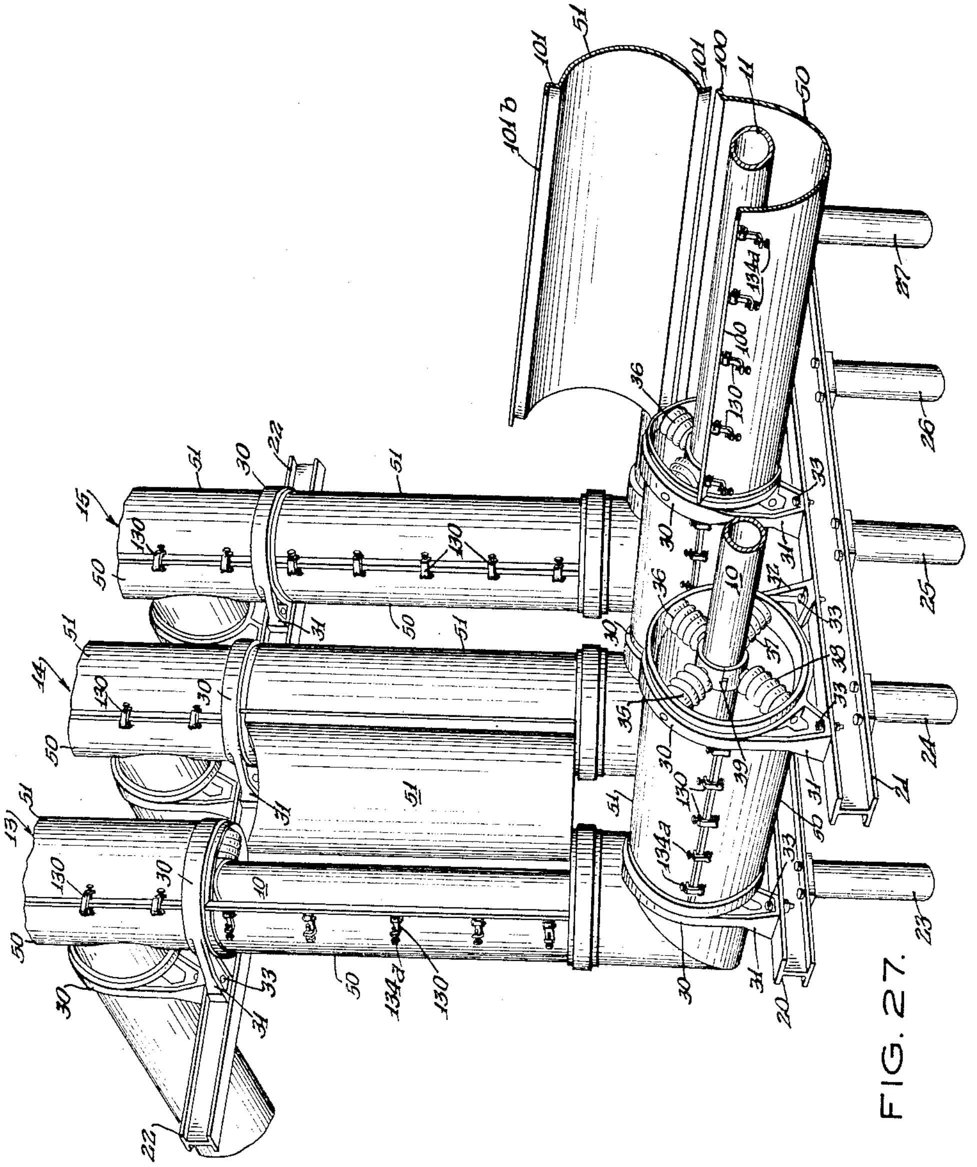

The hinge and clamping structure here shown correspond to the specific showing utilized in the structure of Figure 27.

Figure 17 is a view taken from line 17—17 of Figure 16 looking in the direction of the arrows.

Figure 18 is a view taken from line 18—18 of Figure 16 looking in the direction of the arrows.

Figure 19 is a cross-sectional view taken on line 19—19 of Figure 17.

Figure 20 is a view showing a slightly modified form of the left-hand clamping structure of Figure 16.

Figure 21 is a view taken from line 21—21 of Figure 20 looking in the direction of the arrows.

Figure 22 is a view showing another modified form of clamping structure to be utilized as a substitute for the clamping structure at the left-hand side of Figure 16.

Figure 23 is a view taken from line 23—23 of Figure 22 looking in the direction of the arrows.

Figure 24 is a view corresponding to a portion of Figure 17 showing another modified form of clamping structure.

Figure 25 is a view partly in cross-section taken from line 25—25 of Figure 24 looking in the direction of the arrows.

Figure 26 is an enlarged view showing the method of reinforcing the bent-over flange portion of the housing in the structure of Figure 16.

Figure 26*a* is a view taken from line 26*a*—26*a* of Figure 26.

Figure 27 is a view in perspective of a bus structure utilizing the members described in connection with Figures 1 to 25.

Figure 28:
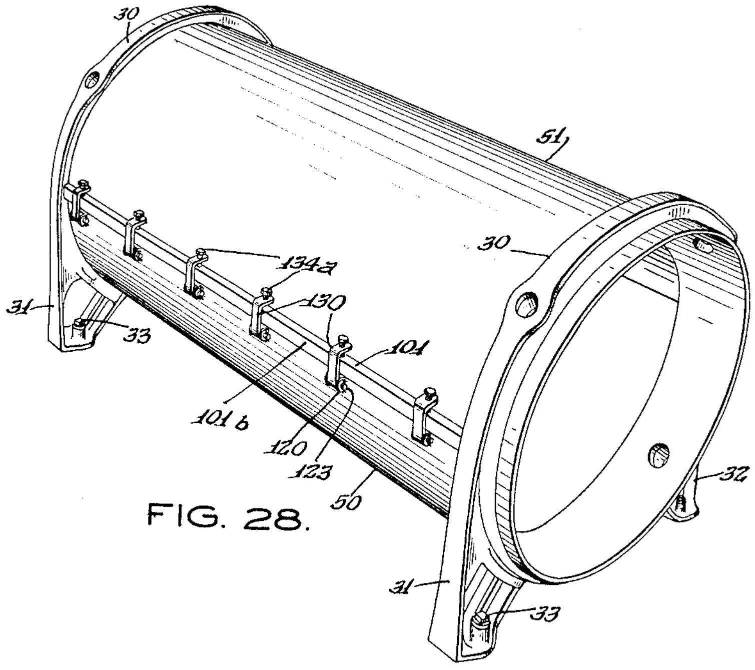

Figure 28 is a view in perspective of one section of housing unit with two ring supports in closed position.

Figure 29:
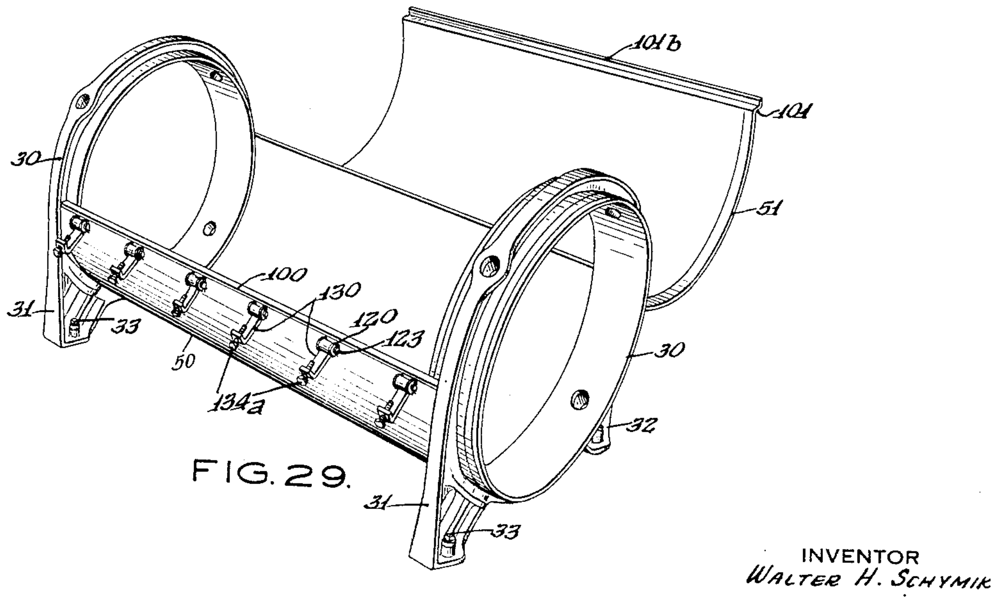

Figure 29 is a similar view with the top of the housing in open position.

Referring first to Figure 27, essentially the type of bus structure here shown is that previously described in Patent No. 2,396,131 as well as in Patent No. 2,293,310 and in application Serial No. 160,899.

Each of the three phases of the bus structure including the buses 10, 11 shown in Figure 27 is enclosed in its own isolated phase bus run 13, 14, 15.

An appropriate framework or sub-structure is provided for the housings which comprises the continuous enclosures 13, 14 and 15. This sub-structure may comprise part of the building itself or may be an independent housing structure engaged schematically by the I beams 20, 21, 22 supported by appropriate structural members 23, 24, 25, 26, 27. A plurality of bus support frames 30 are provided spaced at appropriate intervals, the bus support frames 30 comprising annular members having legs 31, 32 with suitable means such as the bolts 33, 33 for securing the rings to the I beams 20, 21 or 22. The annular rings 30 also provide supports for the insulators 35, 36, 37, 38 which in turn through the clamping rings 39 support the bus lengths 10, 11.

The clamping rings 39 are arranged in the manner described in application Serial No. 160,899 so they may be manipulated either to tightly engage the bus to prevent movement at that point or to loosely engage the bus to permit sliding movement at the point of engagement.

In the mounting of buses in an enclosure, it is preferable that each bus length be held securely against movement at one position, preferably substantially at the center thereof. The remaining support positions of each bus length should preferably be slidably or otherwise arranged so that the bus may shift slightly longitudinally with respect to these support positions.

Thus, as linear changes occur in the bus length owing to thermal conditions, the bus may expand and contract from the substantially central point at which it is held securely while, at the same time, it is slidably or shiftingly supported to permit expansion while the bus is securely positioned at the center of the housings and rings.

The rings 30 as shown in Figures 27, 1, 2, and 4 are provided with a pair of annular ledges 40, 41 extending around the entire ring on each side.

Figures 1, 3:
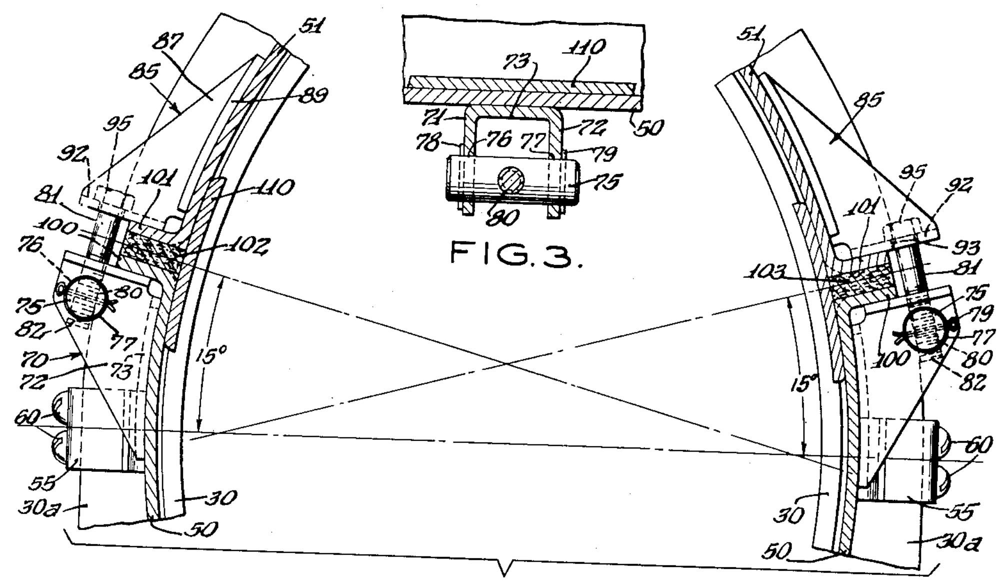
Figure 1 is a cross-sectional view through one form of hinged bus enclosure of the type generally shown in Figure 27.
Figure 3 is a view partially in cross-section taken on line 3—3 of Figure 2 of the hinged structure of the bus enclosure of Figures 1 and 2.
Figures 2, 4, 5:
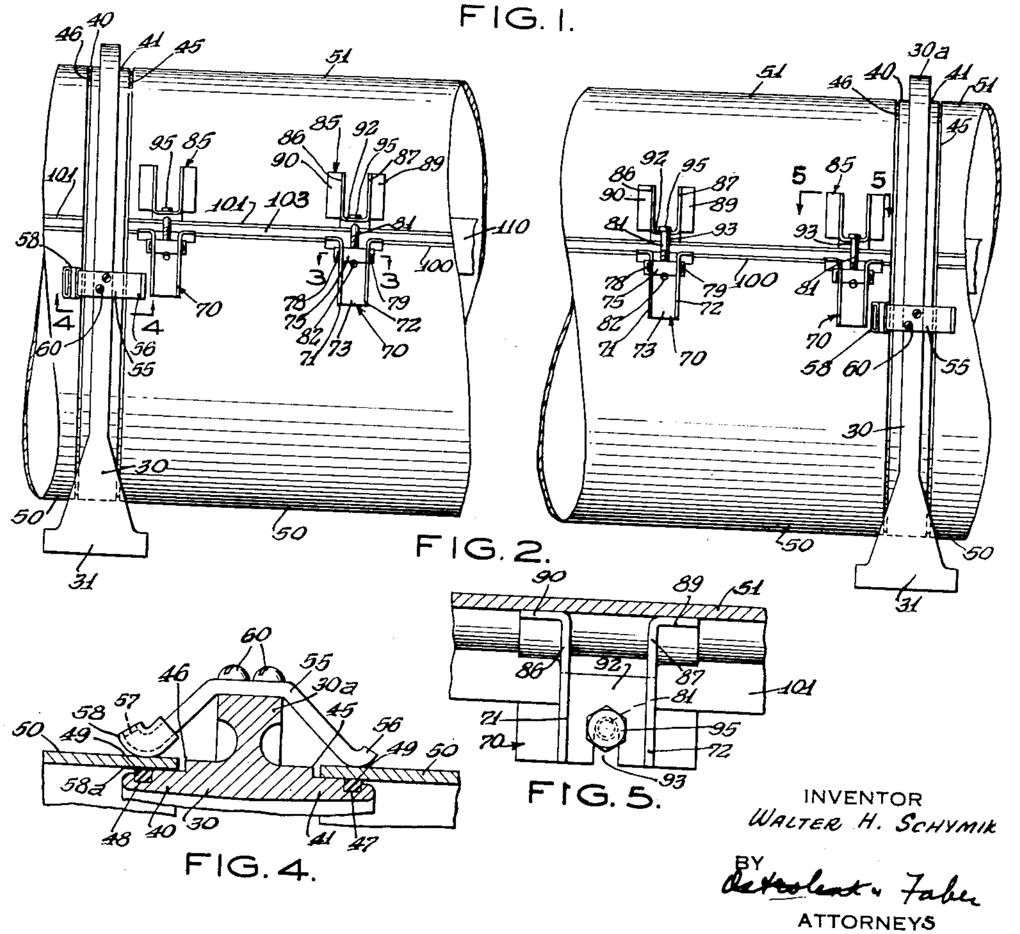
Figure 2 is a side view of the bus enclosure of Figure 1.
Figure 4 is a cross-sectional view taken on line 4—4 of Figure 2 looking in the direction of the arrows.
Figure 5 is a view partly in cross-section of the hinge structure of Figure 1 taken on line 5—5 of Figure 2.

The bus housing as shown particularly in Figures 1, 2, and 27 comprises a lower half cylindrical housing section 50 and an upper half cylindrical housing section 51 made of any appropriate material designed to provide isolated phase protection in the adjacent buses in the bus structure.

The lower half cylindrical housing section 50 is secured between the ledges 41 and 40 of adjacent support rings 30 as seen particularly in Figures 2 and 27.

In order to achieve this securement, the lower housing section 50 is dimensioned so that it will fit over the ledges 40 and 41 of adjacent rings 30, being maintained against longitudinal movement by the rabbets 45 and 46. The ledges 40 and 41 may also be provided with annular grooves 47, 48 in which appropriate annular gaskets 49, 49 may be placed in order to provide a dust and moisture excluding seal for the housing.

A clamping member 55 is provided made essentially of a trapezoidal bent strap of spring steel having curved extensions 56, 57 at its extremeties over which are placed insulating sleeves 58 as shown in Figure 4.

Bolts 60 passing through appropriate openings in the clamping strap 55 enter appropriately tapped openings in the outer surface of the ring 30 to secure the clamping strap 55 in place. The clamping strap 55 is so dimensioned that as the bolts 60 are driven home the clamping strap 55 is spread, and the curved ends 56, 57 thereof are forced tightly against the ends of the housings 50 on opposite sides of the ring 30 to secure the housings 50 tightly against the rings 30 in the position shown in Figures 2 and 4.

A clamping strap 55 of the type shown in Figure 4 may be provided on opposite sides of the ring 30 approximately 150° away from each other around the under side of the ring 30. Additional clamping straps may, if required, be provided at the under side or at other suitable locations.

The insulating sleeve 58 is actually required only on one of the legs 57 of the clamping strap 55 since this will serve isolate one half housing 50 from the longitudinally adjacent half housing 50 on the other side of the ring. Two such insulating sleeves may be provided at either end of the clamping strap 55 when additional assurance of isolation is required.

Similarly and for the same purpose of isolating one half housing 50 from the longitudinally adjacent half housing 50, an annular insulating insert strip 58*a* may be provided between the housing section 50 and the ledge 40 on the same side as the insulating sleeve 58 is provided.

By this means, therefore, the half housing 50 is securely attached between adjacent clamping rings 30 and will serve to longitudinally support the upper half cylindrical housing 51 so that they may readily be opened, the upper half cylindrical housing 51 being, therefore, secured only to the lower half housing 50 and not being required to be secured permanently or semi-permanently to the rings 30.

It will be obvious that while I have here referred to each of the bottom and top half housings 50 and 51 as half cylindrical that these need not be literally half cylindrical.

The top or hinge half 51 of the housing may extend over any arc greater or less than 180° which is necessary or useful to obtain the desired access to the interior of the housing.

Likewise, I have referred to section 50 as the bottom half and section 51 as the top half only for purposes of convenience since actually section 50 is the secured portion and section 51 the hinged portion.

Usually in bus runs the hinged portion 51 will be at the top half, but where the bus run is vertical, the hinged portion 51 while it is referred to as the top half is neither upper nor lower physically than the secured portion of the housing; and in some cases it may be desirable to arrange the hinged portion of the bus run so that it is actually physically the bottom half in order to provide appropriate access for inspection and repair within the bus housing.

In Figures 1, 2, 3 and 5 to 26 I have shown various types of hinging and securing structures which may be utilized to connect the top of hinge half 51 of the bus housing to the bottom or secured half 50 of the bus housing.

In each case it is desired that one side of the hinged bus housing be hingedly secured to the secured section of the bus housing while the other side be provided with appropriate clamping means to effect a full closure of the housing when the hinged portion of the bus is moved to the closed position.

In Figures 1 to 5 I have shown one form of hinge and clamping arrangement wherein both the hinge and the clamp are substantially similar and where, if desired, the arrangement is such that the hinged section 51 of the housing may be opened from either side. For this purpose, the left side of the secured section 50 of the housing with respect to Figure 1 is provided with a clevis 70 comprising a pair of parallel plates 71, 72 in U-shaped conformation with the base plate 73 which is secured in any appropriate manner to the lower section 50 of the housing.

The pin 75 is rotatably mounted in registering openings 76, 77 of plates 71, 72, the pin being held in position in the openings by the cotter pins 78, 79. The pin 75 is provided with the tapped opening 80 into which the threaded end 82 of bolt 81 may be inserted.

The upper or hinged section 51 of the housing is also provided with a clevis 85 having the side plates 86 and 87 in U-shaped confirmation. These side plates are extended at 89 and 90 to provide a means of securement of the clevis 85 to the upper section 51 of the housing.

The plates 86 and 87 have connected between them the additional clamping plate 92 which is provided with the slot 93, the slot 93 being adapted to receive the bolt 81 but being smaller than the head 95 of the bolt 81.

Lower housing section 50 is provided with a longitudinal flange 100 overlying side plates 71 and 72. The upper housing section 51 is provided with a longitudinal flange underlying the side plates 86 and 87.

When the bolt 81 is swung up into the slot 93 and then rotated by engagement of a proper tool with its head 95, the flanges 100 and 101 are compressed toward each other. Appropriate gasketing strips 102, 103 may be mounted on each side between the flanges 100, 101 to ensure a complete moisture and dust excluding seal.

In the structure here shown in Figures 1 to 5, the left-hand side of Figure 1 is intended here to serve as a clamp and the right-hand side is intended to serve as the hinge. These sides are, however, identical and have consequently been given the same reference numbers.

Thus, the left-hand side may serve as the hinge and the right-hand side as the clamp. If the right-hand side is always to serve as a hinge, then the slot 93 may be omitted from the right-hand side and a simple hole may be substituted therefor. However, by providing the slot 93 on each side, the hinge half 51 of each housing section may be opened hingedly at either side and may, if desired, be fully removed.

In order to provide an additional dust excluding seal and to strengthen the housing at the point of seal, a reinforcing longitudinal element 110 may be secured on each side to the upper section of the lower housing section 50.

The corners at the point of connection between flanges 100, 101 with their respective housing elements may be reinforced as hereinafter described particularly in connection with Figures 26 and 26*a*.

In Figures 6 to 10 I have shown a modified construction wherein one side always serves as a hinge and the other side always serves as a clamping construction.

Figures 6, 7, 8, 9, 10, 11, 12, 13, 14, 15:
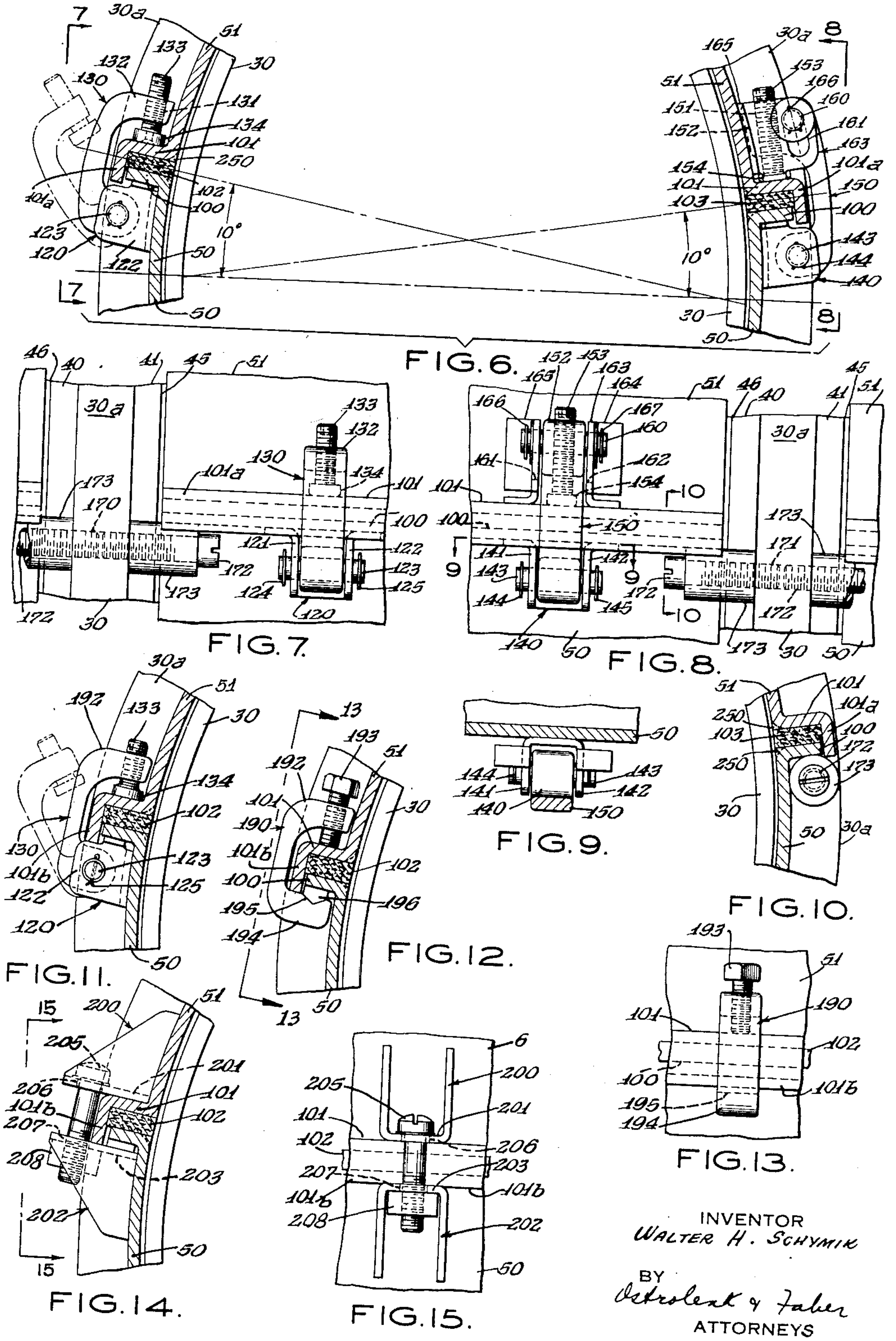
Figure 6 is a cross-sectional view of a modified form of hinge structure for the bus enclosure.
Figure 7 is a view taken from line 7—7 of Figure 6 showing the clamping member.
Figure 8 is a view taken from line 8—8 of Figure 6 showing the hinge member.
Figure 9 is a view partly in cross-section taken on line 9—9 of Figure 8.
Figure 10 is a view partly in cross-section taken on line 10—10 of Figure 8.
Figure 11 is a view corresponding to the left-hand end of Figure 6 showing a slightly modified form of clamping structure.
Figure 12 is another view corresponding to the left-hand side of Figure 6 showing another modified form of clamping structure.
Figure 13 is a view taken from line 13—13 of Figure 12 showing the clamping structure of Figure 12.
Figure 14 is a view corresponding to the left-hand side of Figure 6 showing a further modified form of clamping structure.
Figure 15 is a view taken from line 15—15 of Figure 14.

The left-hand side of Figure 6 is provided with the clamp shown particularly in Figures 6 and 7. In this case, the lower housing section 50 carries the clevis 120 having the plates 121 and 122 between which rotatably support the hinge pin 123 in appropriate openings in the plates 121 and 122; the hinge pin being secured in position by cotter pins 124 and 125.

C-shaped clamping bracket 130 is rotatably mounted on the hinge pin 123, the upper leg 132 of the C carrying in a tapped opening 131 thereof the clamping bolt 133 having the clamping head 134.

The housing sections are provided with flanges 100 and 101 as previously described in connection with Figure 1.

When the C clamp 130 is rotated from the dotted line position of Figure 6 to the solid line position thereof, the bolt 133 may be turned down to clamp the ledges 100 and 101 together with the gaskets 102 and 103 on each side between them.

The upper flange 101 is provided with the downwardly directed extension 101*a* shown at the left-hand side of Figure 6 to provide a reinforcing dust excluding seal for the gaskets 102 and 103. This extension is provided on both sides.

The structure at the right-hand side of Figure 6 in order to provide a hinge arrangement also comprises a clevis 140 on the lower housing, the side plates 141 and 142 of which carry the pin 143 between them, the pin being also held in position by cotter pins 144 and 145. The hinge bracket 150 is pivotally mounted on the pin 143 and is provided at its upper end with the pin 160 which engages in the opposite slots 161, 162 in the upper clevis 163 comprising the plates 164 and 165.

Thus, hinge bracket 150 cannot escape from the clevis 163 since its pin 160 is captured in slots 161 and 162 and held in position by the cotter pins 166 and 167.

Thus, when the C-shaped clamping bracket 130 is released at the left-hand side of Figure 6 as shown by the dotted lines, the upper hinge section 51 of the housing may be rotated clockwise first around the pivot pin 143 and then about the pivot pin 160 or simultaneously about both pins.

However, to secure a dust excluding seal at the gaskets 102 and 103 on the hinge side, my hinge bracket may also be a clamping bracket in which the bolt 153 is provided with the clamping head 154, the bolt being received in the tapped opening 151 of the upper leg 152 of the hinge bracket 150.

After the bus housing is closed, bolt 153 is rotated down to effect a clamping engagement on the right side similar to the clamping engagement by bolt 133 on the left side. To permit opening of the hinge top 51, the C-shaped clamp 130 is moved from the solid line position to the dotted line position of Figure 6 after the release of the clamping bolt 133 on that side and similarly bolt 153 on the hinge side is moved to a released position so that the hinge half 51 of the housing may then be swung up and clockwise to open the housing.

In Figures 7 and 10 I have shown a modified method of securing the secured section 50 of the housing to the ring 30.

The raised portion 30*a* (see Figure 4) of ring 30 is in the modification of Figures 7, 8 and 10 provided with transverse tapped openings at 170, 171.

When the lower section 50 of the housing is placed in position, the bolts 172 carrying the bushings 173 are rotated into the tapped openings 170 and 171 as shown in Figures 7, 8, and 10, these bushings being so dimensioned that they hold the lower housing section 50 in place and particularly being so arranged that they underlie the longitudinal extensions 100 on each side to provide a firm support for the lower housing section 50.

The bushings 173 are of insulating material so that the lower housing sections 50 are isolated from each other.

In Figure 11 I have shown a modified form of the clamp at the left-hand side of Figure 6 in which the clamp bracket 130 and all associated elements are identical with the structure shown in Figure 6, the only exception being that the downwardly extended flange 101*b* is the downwardly extended flange 101*a* of Figure 6 so that this downwardly extended flange bears against the top surface of plates 121 and 122 and thus provides a limit to the clamping pressure which may be imposed on the gaskets 102 and 103.

It will be obvious that any of the clamp members here shown may be used in combination with any of the hinge members here shown and thus that the clamping member of Figure 11 on the left side may be used in combination with a hinge member of Figure 1 on the right side, as well as in combination with other hinge members herein shown.

Likewise, the hinge member at the right-hand side of Figure 6 may be used in combination with a clamping member at the left-hand side of Figure 1 or in combination with any of the other clamping members here shown.

In Figures 12 and 13 I have shown a modified form of clamping member wherein the C-shaped clamping bracket 190 is removable. The housing sections 50 and 51 are provided with the flanges 100 and 101, the gaskets 102 and 103 on each side and the downwardly extending flange 101*b*.

The upper leg 192 of the clamping bracket is provided with the clamping bolt 193 in threaded engagement therewith. The lower leg 194 of the clamping bracket 190 is provided with the notch 195 engageable with the correspondingly shaped member 196 secured to the underside of the lower ledge 100.

It will here be obvious that tightening of bolt 193 effects a clamping action and loosening of bolt 193 releases the clamping action. The member 196 may be relatively soft and slightly deformable, if desired, to ensure good clamping pressure.

In Figures 14 and 15 I have shown another modified form of clamping arrangement wherein the hinge section is provided with a clevis 200 having the substantially horizontal platform 201 and the secured portion is provided with a clevis 202 having the substantially horizontal platform 203.

It should here be noted that the utilization of the term horizontal is to be defined by the previous reference to the hinge section 51 as an upper section and the secured section 50 of the housing as a lower section.

The relative orientation may change as previously described, but the term horizontal is used for convenience in defining the orientation of the various parts with respect to the enclosure members.

Thus, in a vertical bus run the "horizontal" platforms 201 and 203 may actually extend vertically. In this case, the clamping action of Figures 14 and 15 is provided by a bolt 205 passing through the aligned openings 206, 207 in platforms 201 and 203 and into the nut 208, the nut being so dimensioned that it cannot rotate between the plates of clevis 202.

The openings 206 and 207 may be circular openings, in which case to release the clamp entirely and thereby permit opening of the hinge top it will be necessary to withdraw the bolt 205 from the nut 208. Preferably the openings 206 and 207 are slotted and connected with the outer edges of the platforms 201 and 203 so that the bolt 205 after having been loosened may be withdrawn with its nut from the clevises 201 and 202 without the necessity for a full rotation of the bolt 205 out of the nut 208.

In Figures 16, 17 and 18 I have shown a slight modification of the structure of Figures 6 to 9, the modification being such that the description heretofore set forth with respect to Figures 6 to 9 is applicable with equal force to Figures 16 to 18, the only essential difference being that the flange 101*b* is extended for the purpose shown in Figure 11 and the bolt 133*a* on the clamping side and the bolt 153*a* on the hinge side are reversed so that the heads 134*a* and 154*a* are accessible for operation by a tool; the bolts, therefore, do not require a special conformation of their opposite end to render them operable by a tool.

The heads 134*a* and 154*a* of the bolts 133*a* and 153*a*, respectively, are no longer clamping heads but merely the sections of the bolts which may readily be engaged by a tool.

In Figures 17, 18 and 19 I have also shown a modified method of securing the lower secured section 50 of the housing to the annular rings 30.

In this case, instead of housing the spring clamping strap 55 of Figure 4, the annular strip 55*a* may be provided on each side secured in position by bolts 60*a* extending into the heads 40 and 41. The other elements are identical except that the insulating strip 58*b* on one side is folded around the end of the secured housing section on one side to ensure full isolation of the housing section from the ring 30 and hence the longitudinally adjacent secured bus section 50.

Instead of a continuous strip 55*a* on each side, the said strip having an arcuate length, of course, equal to the arcuate length of the housing section 50, a plurality of individual clips may be utilized for the same purpose.

In Figures 20 and 21 I have shown a slightly modified form of the C-shaped clamping member of Figures 6 and 16 and consequently the elements have been given the same reference numbers as Figures 6 and 16, the only essential difference being that instead of mounting the pin 123 in openings in the lower clevis 120, the pin 123 is mounted in slots 210 in the lower clevis 120 so that the C-shaped clamp 130 may more readily swing out and down.

In Figures 22 and 23 I have shown another form of clamping member wherein the housing structure, flanges 100 and 101 and associated elements are the same.

However, the lower housing 50 is fitted with the bracket 220 having the tapped opening 221 therein and extending up outside the flange 101 and 101*b*. A bolt 222 enters the tapped opening 221 but has rotatably mounted thereon the clamping element 225. Clamping element 225 may be rotated to the position shown by the solid lines of Figures 22 and 23 to engage the top surface of flange 101 and thus clamp the upper housing section 51 to the lower housing section 50.

After the bolt 22 is loosened, the clamping element 225 may be rotated to the dotted line position where it is out of clamping engagement with the upper surface of flange 101 so that the hinge top section 51 of the housing may be lifted.

The clamping member 225 may be provided with the downwardly extending latch 226 to prevent accidental rotation out of clamping position when the bolt 222 is downwardly pressed for clamping engagement.

In Figures 24 and 25 I have shown a modified form of the C-shaped clamping member 130 of Figures 6, 16 and 20 in which the operation is identical with that already described in connection with Figure 20.

However, the C-shaped clamping bracket 130 instead of being held on pin 123 as described in connection with Figures 6, 16 and 20, is so arranged that its lower leg 230 enters the slot 231 in the support bracket 232 on the lower housing.

The lower leg 230 of the C-shaped clamping bracket is provided with cross-bar 232a which is wider than the slot 231 so that when the C-shaped clamping bracket 130 of Figure 25 is swung to the dotted line position of Figure 25, the cross-bar 232 will prevent accidental removal of the clamping bracket 130.

Thus, another type of hinge mounting for the clamping bracket 130 is provided.

In Figures 26 and 26a I have shown the manner in which the curve between the flanges 100 and 101 and their respective housing sections 50 and 51 on each side may be built up at the clamping areas on each side to make a continuous inner circle in which a straight piece of gasket material may be used to provide an efficient seal at the insulator rings.

An aluminum weld or other material may be built up as shown at 250 of Figures 26 and 26a, as well as at 250 of Figures 1, 6 and 16 in order to provide the necessary right angle surfaces to produce a continuous inner circle and permit a straight gasket to be used.

As previously pointed out, the various clamping structures may be utilized in connection with various hinge structures so that the clamping structure of Figure 1 may be utilized in connection with, for instance, the hinge structure of Figure 6 and the hinge structure of Figure 16 may be utilized in connection with, for instance, the clamping structure of Figure 14.

Similarly, the methods of securing the secured section 50 of the housing in position may be utilized in various ways. Thus, the securement of Figure 4 may be utilized in connection with the structure of Figure 16, and the method of securement of Figure 8 may be utilized in connection with the structure of Figure 1.

In all of these cases the prime consideration is the provision of a bus housing with a hinge cover, said hinge cover being operable irrespective of whether it happens to extend at the top, at the bottom or along the side of a bus housing.

In some of the forms herein described, the hinge cover may selectively be utilized as a hinge cover or as a removable cover depending on the needs of the operator.

I claim:

1. A sectionalized bus enclosure comprising a plurality of bus support frames spaced at appropriate intervals, each of said frames comprising annular members having legs, a structural support for each of said frames, insulators supported by said frames, said insulators supporting said bus, each of said frames having an annular groove carrying an annular gasket on each side of said frames, a bus housing comprising a first and second partly cylindrical section, the first and second sections forming a cylinder, the first section being secured between adjacent supporting frames, flanges formed throughout the length of and along both sides of each of said housing sections, a hinge support for said second section on each flange of said first section, gaskets secured to each of the flanges of one of said sections so that when said sections are in engagement with each other for closure, a moisture and dust proof seal is provided, a clamping member pivotally mounted on said hinge supports on both sides of said first cylindrical section, said clamping member being pivotally movable in its support for engaging and securing the adjacent flange of said second section to the fixed cylindrical section so that when the clamps along one side engage and are secured to the adjacent flanges, said second section is rotatable on said pivotal support for permitting opening of said second section from the opposite side.

2. A sectionalized enclosure comprising a plurality of bus support frames spaced at appropriate intervals, insulators supported by said frames, said insulators supporting said bus, each of said frames having an annular groove carrying an annular gasket on each side of said frames, a bus housing comprising a first and second partly cylindrical section, the first and second sections forming a cylinder, the first section being secured between adjacent supporting frames, flanges formed throughout the length of and at each side of each of said housing sections, clamping means on each side of said cylindrical sections, said clamping means comprising a plurality of pins, one of said pins being mounted at the flange of said second section on one side and another of said pins being rotatably mounted at the flange of said second section on the opposite side, said clamping means further comprising a clamp pivotally mounted on each of said pins and rotatable on its associated pin into clamping engagement with the adjacent flange of said first section, gaskets secured to the flanges of one of said sections so that when said sections are brought into engagement with each other for closure, a moisture and dust proof seal is provided, said clamping means, when in clamping engagement along one side, providing a pivotal support on its associated pin for permitting rotatable movement of said first section on said pin to open position from the opposite side.

3. A sectionalized bus enclosure comprising a plurality of bus support frames spaced at appropriate intervals, insulators supported by said frames, said insulators supporting said bus, each of said frames having an annular groove carrying an annular gasket on each side of said frames, a bus housing comprising a first and second partly cylindrical section, the first and second sections each extending between said rings and forming a cylinder, the first section being secured between adjacent supporting frames, flanges formed throughout the length of and at the side of said housing sections, a hinge support for said second section on a flange of said first cylindrical section, gaskets secured to said flanges so that when one of said sections is rotated with respect to the other for closure, a moisture and dust seal is provided, and a clamping member pivoted at a flange of said first housing section for securing the side opposite the pivoted side of said pivoted cylindrical section to the fixed cylindrical section, said clamping member and hinge support being constructed so that the pivoted section can be pivoted open from either side and clamped at either side, said clamping member and hinge support comprising identical components, said identical components comprising a base plate, a clevis attached to said first section in U-shaped conformation with said base plate, a rotatable pin supported by said clevis, a second clevis attached to said second section, a bolt supported by said second clevis for detachably securing said first and second clevis.

WALTER H. SCHYMIK.

References Cited in the file of this patent

UNITED STATES PATENTS

| Number | Name | Date |
|---|---|---|
| 1,913,552 | Jackson | June 13, 1933 |
| 1,992,574 | Jenkins | Feb. 26, 1935 |
| 2,396,131 | Scott | Mar. 5, 1946 |